(12) United States Patent
Li et al.

(10) Patent No.: US 11,487,469 B2
(45) Date of Patent: Nov. 1, 2022

(54) APPARATUS AND METHOD FOR CONTROLLING ACCESS TO MEMORY MODULE

(71) Applicant: MONTAGE TECHNOLOGY CO., LTD., Shanghai (CN)

(72) Inventors: Yi Li, Shanghai (CN); Gang Shan, Shanghai (CN); Howard Chonghe Yang, Shanghai (CN)

(73) Assignee: MONTAGE TECHNOLOGY CO., LTD., Shanghai (CN)

( * ) Notice: Subject to any disclaimer, the term of this patent is extended or adjusted under 35 U.S.C. 154(b) by 166 days.

(21) Appl. No.: 16/847,623

(22) Filed: Apr. 13, 2020

(65) Prior Publication Data

US 2020/0333984 A1  Oct. 22, 2020

(30) Foreign Application Priority Data

Apr. 19, 2019  (CN) .......................... 201910320442.7

(51) Int. Cl.
*G06F 3/06* (2006.01)
*G06F 21/60* (2013.01)
(Continued)

(52) U.S. Cl.
CPC .......... *G06F 3/0659* (2013.01); *G06F 3/0604* (2013.01); *G06F 3/0622* (2013.01);
(Continued)

(58) Field of Classification Search
CPC .... G06F 3/0659; G06F 3/0604; G06F 3/0622; G06F 3/0653; G06F 3/0673; G06F 21/602; G11C 8/06; G11C 8/18
(Continued)

(56) References Cited

U.S. PATENT DOCUMENTS

2003/0101307 A1* 5/2003 Gemelli ................. G06F 30/30
  710/305
2008/0198651 A1* 8/2008 Kim ..................... G06F 12/0246
  365/185.03

(Continued)

FOREIGN PATENT DOCUMENTS

CN  104636271 A  5/2015

OTHER PUBLICATIONS

The first office action and search report of the corresponding Chinese application CN201910320442.7, dated Aug. 27, 2021.

*Primary Examiner* — Edward J Dudek, Jr.
*Assistant Examiner* — Sidney Li
(74) *Attorney, Agent, or Firm* — Jun He Law Offices P.C.; James J. Zhu

(57) ABSTRACT

An apparatus controls access to a memory module coupled to a host controller via a data bus to exchange data with the host controller. The apparatus has a configurable information memory and comprises: an access control input port via which the apparatus receives a data access command from the host controller; a control unit to identify a data access command including an access address directed to a predetermined storage region of the memory module, and generate an information processing command based at least on the access address directed to the predetermined storage region, such that the control unit can configure the information memory based on the information processing command or provide the information processing command to the memory module; and an access control output port via which the apparatus provides the information processing command to the memory module, such that the memory module outputs corresponding data information to the host controller based on the information processing command.

17 Claims, 8 Drawing Sheets

(51) Int. Cl.
*G11C 8/06* (2006.01)
*G11C 8/18* (2006.01)
*G06F 21/79* (2013.01)
*G11C 5/04* (2006.01)
*G06F 13/16* (2006.01)

(52) U.S. Cl.
CPC .......... *G06F 3/0629* (2013.01); *G06F 3/0653* (2013.01); *G06F 3/0673* (2013.01); *G06F 21/602* (2013.01); *G11C 8/06* (2013.01); *G11C 8/18* (2013.01)

(58) Field of Classification Search
USPC ....................................................... 711/154
See application file for complete search history.

(56) References Cited

U.S. PATENT DOCUMENTS

| | | | |
|---|---|---|---|
| 2010/0106926 A1* | 4/2010 | Kandasamy | G06F 11/366 711/163 |
| 2010/0153672 A1* | 6/2010 | Jogand-Coulomb | G11C 16/22 711/164 |
| 2014/0164676 A1* | 6/2014 | Borchers | G06F 12/0246 711/103 |
| 2018/0122434 A1* | 5/2018 | Lee | G11C 5/04 |

* cited by examiner

Memory Bank= 3, Row= 522

| | |
|---|---|
| Column=0 | Start to configure Rule 0 |
| Column=1 | Start to configure Rule 1 |

⋮

| | |
|---|---|
| Column=99 | Start to configure Rule 99 |
| Column=100 | End of Configuration |
| Column=101 | Confirm availability |
| Column=200 | Value bit0=0 |
| Column=202 | Value bit0=1 |
| Column=204 | Value bit1=0 |
| Column=205 | Value bit1=1 |

⋮

| | |
|---|---|
| Column=576 | Value bit30=0 |
| Column=577 | Value bit30=1 |
| Column=578 | Value bit31=0 |
| Column=579 | Value bit31=1 |

FIG. 2

Memory Bank=3, Row=520

| |
|---|
| Column=0   Read data info. in Register 0 |
| Column=1   Read data info. in Register 1 |
| Column=2   Read data info. in Register 2 |
| ⋮ |
| Column=99 Read data info. in Register 99 |
| Column=101         Start to read |
| Column=102         End of reading |
| Column=200   Data info. A in Register 0 |
| Column=202   Data info. B in Register 0 |
| Column=204   Data info. C in Register 0 |
| Column=205   Data info. D in Register 0 |
| ⋮ |
| Column=576   Data info. A in Register 99 |
| Column=577   Data info. B in Register 99 |
| Column=578   Data info. C in Register 99 |
| Column=579   Data info. D in Register 99 |

FIG. 4

Memory Bank=3, Row=520

| Column=0 | Read data info. in Register 0 |
|---|---|
| Column=1 | Read data info. in Register 1 |
| Column=2 | Read data info. in Register 2 |
| ⋮ | |
| Column=99 | Read data info. in Register 99 |
| Column=101 | Start to read |
| Column=102 | Sequential reading |
| Column=103 | End of reading |
| Column=200 | Value=0 |
| Column=202 | Value=1 |

FIG. 6

Memory Bank=3, Row=520

| | |
|---|---|
| Column=0 | Read data info. in Register 0 |
| Column=1 | Read data info. in Register 1 |
| Column=2 | Read data info. in Register 2 |
| ⋮ | |
| Column=99 | Read data info. in Register 99 |
| Column=101 | Stat to read |
| Column=102 | Sequential reading |
| Column=103 | End of reading |
| Column=200 | Value bit0=0 |
| Column=202 | Value bit0=1 |
| Column=204 | Value bit1=0 |
| Column=205 | Value bit1=1 |
| ⋮ | |
| Column=576 | Value bit30=0 |
| Column=577 | Value bit30=1 |
| Column=578 | Value bit31=0 |
| Column=579 | Value bit31=1 |

FIG. 8

APPARATUS AND METHOD FOR CONTROLLING ACCESS TO MEMORY MODULE

FIELD OF THE INVENTION

The present application relates to the field of memory technology, and more particularly, to an apparatus and method for controlling access to a memory module.

BACKGROUND

A registering clock driver is commonly used in memory modules such as double-rate (DDR) synchronous dynamic random access memories, to control the access to the memory modules based on data access commands provided by a main controller (such as a central processing unit). The registering clock driver usually stores access control rules for the memories. The main controller can use a bidirectional serial bus (e.g. an $I^2C$ bus such as SMBus) between itself and the registering clock driver to configure configuration information, e.g. access control rules.

However, an interaction speed of the above serial bus is slow, and the serial bus may be disabled or restricted for communication after the host controller completes the configuration of the registering clock driver and the memory module, which restricts access and configuration to the registering clock driver. In particular, in some cases, it may be desired to dynamically configure the registering clock driver while the system is running, or it may be desired to obtain some operation records in the registering clock driver.

Therefore, it is desired to provide an improved access control method.

SUMMARY

An objective of the present application is to provide an apparatus and method for controlling access to a memory module, so as to dynamically configure and access an information memory for storing data information in the access control device of the memory module.

In one aspect of the application, an apparatus for controlling access to a memory module is provided. The memory module is coupled to a host controller via a data bus to exchange data with the host controller. The apparatus has a configurable information memory and comprises: an access control input port via which the apparatus receives a data access command from the host controller; a control unit configured to identify a data access command including an access address directed to a predetermined storage region of the memory module, and generate an information processing command based at least on the access address directed to the predetermined storage region, such that the control unit can configure the information memory based on the information processing command or provide the information processing command to the memory module; and an access control output port via which the apparatus provides the information processing command to the memory module, such that the memory module outputs corresponding data information to the host controller based on the information processing command.

In some embodiments, the access control input port comprises a command/address signal input port coupled to the host controller.

In some embodiments, the access control output port comprises a command/address signal output port coupled to the host controller.

In some embodiments, the data access command is a write command or a read command directed to the predetermined storage region, and the control unit is configured to convert the access address included in the write command or the read command into a corresponding information write command, and configure the information memory based on the information write command.

In some embodiments, the data access command is a read command directed to the predetermined storage region, and the control unit is configured to generate one or more corresponding information read commands based on the access address included in the read command and data information stored in the information memory, wherein at least a portion of the generated one or more information read commands comprise one or more access address directed to the predetermined storage region, such that, after the at least a portion of the generated one or more information read commands are provided to the memory module, the memory module can output corresponding data information to the host controller via the data bus based on the one or more access addresses directed to the predetermined storage region.

In some embodiments, the data information is stored in the predetermined storage region in a preset data mode.

In some embodiments, the data information is stored in encrypted form.

In some embodiments, the information memory is configured to store configuration information of an access control rule for monitoring access to the memory module.

In some embodiments, the apparatus is integrated in a register clock driver.

In some embodiments, the memory module is coupled to the host controller via the data bus and a data buffer.

In another aspect of the application, a storage system including a memory module and an apparatus for controlling access to the memory module is provided. The memory module is coupled to a host controller via a data bus to exchange data with the host controller. The apparatus has a configurable information memory and comprises: an access control input port via which the apparatus receives a data access command from the host controller; a control unit configured to identify a data access command including an access address directed to a predetermined storage region of the memory module, and generate an information processing command based at least on the access address directed to the predetermined storage region, such that the control unit can configure the information memory based on the information processing command or provide the information processing command to the memory module; and an access control output port via which the apparatus provides the information processing command to the memory module, such that the memory module outputs corresponding data information to the host controller based on the information processing command.

In yet another aspect of the application, a method for controlling access to a memory module is provided. The memory module is coupled to a host controller via a data bus to exchange data with the host controller. The method comprises: A) receiving a data access command from the host controller; B) identifying a data access command including an access address directed to a predetermined storage region of the memory module, and generating an information processing command based at least on the access address directed to the predetermined storage region; and C) configuring a configurable information memory based on the information processing command, or providing the information processing command to the memory module, such that the memory module outputs corresponding data information based on the information processing command.

The above is an overview of the present application, and there may be cases of simplification, generalization, and omission of details. Therefore, those skilled in the art should realize that this section is only illustrative and not intended to limit the scope of the application in any way. This summary is not intended to identify key features or essential features of the claimed subject matter, nor is it intended to be used as an aid in determining the scope of the claimed subject matter.

BRIEF DESCRIPTION OF THE DRAWINGS

The above and other features of the present application will be more fully understood from the following description and appended claims. It will be appreciated that these drawings depict only several embodiments of the present application, therefore not to be considered as limiting the scope of the present application. The content of the present application will be more clearly and in detail explained by the accompanying drawings.

FIG. 2 illustrates a conversion table of access addresses and information processing commands according to an embodiment of the present application;

FIG. 4 illustrates a conversion table of access addresses and information processing commands according to an embodiment of the present application;

FIG. 6 illustrates a conversion table of access addresses and information processing commands according to an embodiment of the present application;

FIG. 8 illustrates a conversion table of access addresses and information processing commands according to an embodiment of the present application.

DETAILED DESCRIPTION OF THE DRAWINGS

Figure 1:
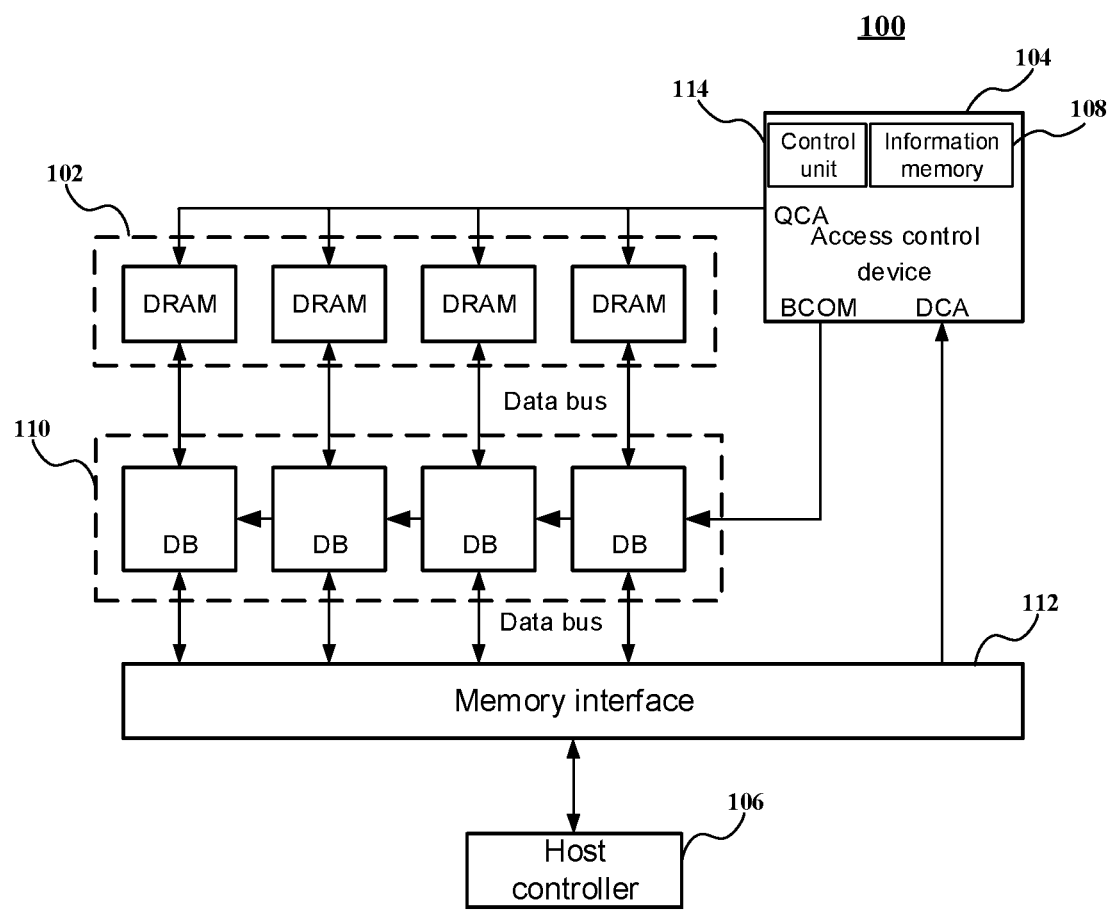
FIG. 1 is a memory system 100 according to an embodiment of the present application.

In the following detailed description, reference is made to the accompanying drawings that form a part thereof. In the drawings, like symbols generally indicate like components unless the context indicates otherwise. The illustrative embodiments described in the detailed description, drawings, and claims are not intended to be limiting. Other embodiments may be utilized, and other changes may be made, without departing from the spirit or scope of the subject matter of the application. It is to be understood that the various aspects of the subject matter of the present invention, which are generally described in the present application and illustrated in the accompanying drawings, can be configured, substituted, combined, and designed, all of which clearly constitute the content of the present application.

FIG. 1 illustrates a memory system 100 according to one embodiment of the present application.

As shown in FIG. 1, the memory system 100 includes a memory module (DRAM) 102, which is configured as a memory module in this embodiment for storing data. In some embodiments, the memory module 102 may be a memory module complying with the JEDEC double-rate synchronous dynamic random access memory (SDRAM) standard, for example, including JEDEC DDR, DDR2, DDR3, DDR4, DDR5, and other double-rate memory standards. In addition, the memory module 102 may also be a memory, such as an SDRAM or RAMBUS memory, conforming to other memory standards or protocols, or may be a memory conforming to a future memory standard or protocol. In some embodiments, the memory module 102 may include a volatile memory (e.g., a dynamic random access memory), a non-volatile memory (e.g., a flash memory such as a NAND or NOR flash memory), or a combination thereof. In other embodiments, the memory module 102 may also be new types of memories manufactured using different manufacturing processes, including but not limited to: a magnetic resistive memory, a phase change memory, a resistive memory, a half floating gate memory, or any other types of memory. It can be understood that the memory module 102 may be composed of one type of memory, or may also include multiple or all of the foregoing or other types of memories, or more other types of memories.

In addition, it should be noted that the memory module 102 described herein may be a single memory chip, or may include two or more memory chips. Further, the structure of a memory array or the memory chips included in the memory module 102 may adopt various suitable interconnection structures. For example, multiple memory chips may form a memory module in parallel; alternatively, multiple memory chips may also adopt a multi-level (e.g., two levels) interconnect structure. For example, one or more memory chips can be used as a first-level storage, while another one or more memory chips can be used as a second-level storage, providing different levels of storage. The second-level storage at a lower level can communicate data with exterior components of the memory module through the first-level storage.

As shown in FIG. 1, the memory system 100 further includes an access control device 104 for performing access control on the memory module 102. Specifically, the access control device 104 is coupled between a host controller 106 and the memory module 102, and can receive from the host controller 106 a data access command including an access address and an access type. For example, the data access command may be a command to access (e.g., read or write) one or more data storage addresses (i.e., access addresses) in the memory module 102.

The access control device 104 has a configurable information memory 108, which includes, for example, one or more registers or other types of volatile or non-volatile memory. In some embodiments, the information memory may be integrated in the access control device 104 or may be coupled to other components of the access control device 104 as a separate component. The information memory may be used to store data information such as configuration information of the access control rules, so that the access control of the memory module 102 by the access control device 104 can be implemented according to the configuration or the modification of the access control rules. For example, the access control rule can be a rule for monitoring access to the memory module 102, and may include a rule that allows or prohibits access to a specific storage space in the memory module 102, or may include a rule that allows or prohibits access from a specific application of the host controller 106 or a user to the memory module 102. In some embodiments, the information memory 108 may also store other data information, such as operation records or error records during data access, or other data information generated during the operation of the access control device 104.

The access control device 104 also has a control unit 114, which is a control module with data processing and/or computing capabilities. In some embodiments, the modules with data processing and/or computing capabilities may be implemented by software, hardware, firmware, or a combination thereof.

Accordingly, the access control device 104 may have an access control input port (DCA), which is coupled to the host controller 106 through an access control input bus to receive a data access command. The access control device 104 also has an access control output port (QCA), which is coupled to the memory module 102 through an access control output bus, thereby addressing the memory unit in the memory module 102 to be accessed. For a memory system conforming to, for example, the DDR3 or DDR4 standard, the access control device 104 may be integrated in a registering clock driver. Accordingly, the access control input port may include a command/address signal input port coupled to the host controller 106, and the access control output port may include a command/address signal output port coupled to the memory module 102. In other words, the access control input port and the access control output port can be implemented by using the ports in existing standards without adding additional ports and buses, which improves the compatibility of the access control device with existing memory systems.

In the embodiment shown in FIG. 1, the memory system 100 further has a data buffer (DB) 110, which is coupled between the memory module 102 and the host controller 106, and is configured to exchange data between the memory module 102 and the host controller 106 under the control of the access control device 104. In other words, the memory module 102 and the host controller 106 are indirectly coupled together through the data buffer 110 and the data bus. The access control device 104 may be coupled to the data buffer 110 through a data buffer control bus (e.g. a BOOM bus) to coordinate and control the buffering of data by the data buffer 110. In some alternative embodiments, the memory system may not have a data buffer, and the memory module and the host controller can be coupled together through a data bus and perform data interaction therebetween. A memory system that complies with the DDR4 standard may include, for example, chips with model no. M88DDR4DB02 (data buffer chip) and model no. M88DDR4RCD02 (registering clock driver chip) provided by Montage Technology Co., Ltd. Technical information about these chips can be referred to their product data sheets, the entire contents of which are incorporated herein by reference.

Still referring to FIG. 1, the access control device 104 and the data buffer 110 are both coupled to a memory interface 112 to perform signal and data interaction with the host controller 106 via the memory interface 112.

The inventors of the present application have found that the access control input bus and the data bus are high-speed buses (compared to the SMBus bus), and the access control input bus and the data bus are kept available during the process of the host controller 106 accessing the memory module 102, because the host controller 106 needs to provide, via these buses, data access commands to the access control device 104 as well as write into and read from the memory module 102 data information. Therefore, the access control input bus can be utilized to provide special data access commands to the access control device 104, so that the access control device 104 can process the information memory 108 in response to the special data access commands.

The inventors further discovered that the access control input bus is a unidirectional bus from the host controller 106 to the access control device 104, and the data bus is a bidirectional bus between the host controller 106 and the memory module 102. Therefore, the access control input bus can be used to provide the device 104 with information processing commands for configuring the information memory 108, that is, writing configuration information or other data information into the information memory. Further, the access control input bus can be used to provide to the access control device 104 an information processing command for reading the information memory, and the data bus can be used to output corresponding data information from the memory module 102 to the host controller 106, where the data information is output by the memory module 102 under the control of the access control device 104 according to the information processing command, that is, reading out the data information. Since the access control input bus is used to provide a special data access command for generating an information processing command, this special data access command may have the same or similar format as a normal data access command. However, the access control device 104 may identify various special data access commands based on the respective access addresses, and generate corresponding information processing commands which are distinguishable from the normal data access command. The identifying, generation, and execution of the above-mentioned information processing commands may be implemented by the control unit 114, and the description below can be referred to for details.

The access control device 104 of the present application will be further described with reference to the example shown in FIG. 1.

The data access command provided by the host controller 106 to the access control device 104 generally includes an access address and an access type, and different access addresses correspond to different storage regions in the memory module 102. In order to distinguish a special data access command for an information memory from a normal data access command, a predetermined storage region may be set in the memory module 102, and the special data access command includes an access address directed to the predetermined storage region. When the access control device 104 receives a data access command directed to the predetermined storage region, the control unit 114 may identify, according to the corresponding access address, that the access is by a special data access command for the information memory, rather than by a normal data access command. Correspondingly, when the access control device 104 receives a data access command directed to a storage region other than the predetermined storage area, it can identify that the access is a normal data access, and can therefore respond according to existing data access operations.

Further, the predetermined storage region for identifying a special data access command may generally include a plurality of storage addresses, and thus these storage addresses may be encoded so that different storage (access) addresses correspond to different special data access commands. Accordingly, the control unit 114 can decode the access address included in the special data access command and convert it into an information processing command for the information memory. The Information processing command can be defined as needed. In some embodiments, the information processing command may include an information write command for writing data information such as configuration information into the information memory; and the information processing command may include an information read command for reading data information from the information memory.

In order to convert and generate the information processing command, the control unit 114 has or has access to, for example, a conversion table of access addresses and information processing commands. In this way, the control unit 114 can decode a special data access command, and generate an information processing command based on at least the access address included in the data access command. It can be understood that, in order to read out the data information stored in the information memory, the control unit 114 may also generate one or more information read commands based on the access address and the data information stored in the information memory, which will be described in detail below.

FIG. 2 illustrates a conversion table of access addresses and information processing commands according to an embodiment of the present application. Based on the conversion table, an information write command for configuring the information memory can be generated. When the data access command received by the access control device 104 is a write command directed to a predetermined storage region, the control unit 114 may generate a corresponding information write command according to the conversion table.

As shown in FIG. 2, Row 522 of Memory Bank 3 in the memory module is set as a predetermined storage region for identifying a data access command. When the access control device receives a write command directed to the predetermined storage region, it identifies that the write command is a special data access command for configuring the information memory according to the access address included in the write command. It can be understood that when the data access command received by the access command device is not directed to Row 522 of Memory Bank 3, but is an address other than addresses directed to the predetermined storage region of the memory module 102, the device can respond to the data access command by executing a normal data access operation.

Further, according to the access addresses in the data access commands that are directed to various columns, such as Column 0 to Column 579 shown in FIG. 2, the control unit may convert the access addresses into information processing commands corresponding to different functions and configuration operations. For example, a data access command directed to Row 522 and Column 0 can be converted into a command for starting to configure Configuration Rule 0 in the information memory, and a data access command directed to Row 522 and Column 1 can be converted into a command for starting to configure Configuration Rule 1 in the information memory, and so on. For another example, a data access command directed to Row 522 and Column 100 may be converted into a command for ending the configuration of the information memory, and a data access command directed to Row 522 and Column 101 may be converted into a command for confirming the availability of the configuration operation. In addition, data access commands directed to Row 522, Columns 200 to 579 may be respectively converted into commands for setting different bits of the information memory as 0 or 1 respectively based on the configuration information to be written into the information memory. It can be understood that, in addition to the information processing commands shown in FIG. 2, there may be information processing commands corresponding to other operations, such as commands for tracking settings, data protection settings, and the like. Those skilled in the art can add, reduce, or modify these information processing commands according to actual needs, and define access addresses corresponding to these information processing commands.

In the above example, a write command is converted into an information processing command for configuring the information memory. In some other embodiments, a read command may also be converted into an information processing command for configuring the information memory, because the read command may also include a required access address.

Figure 3:
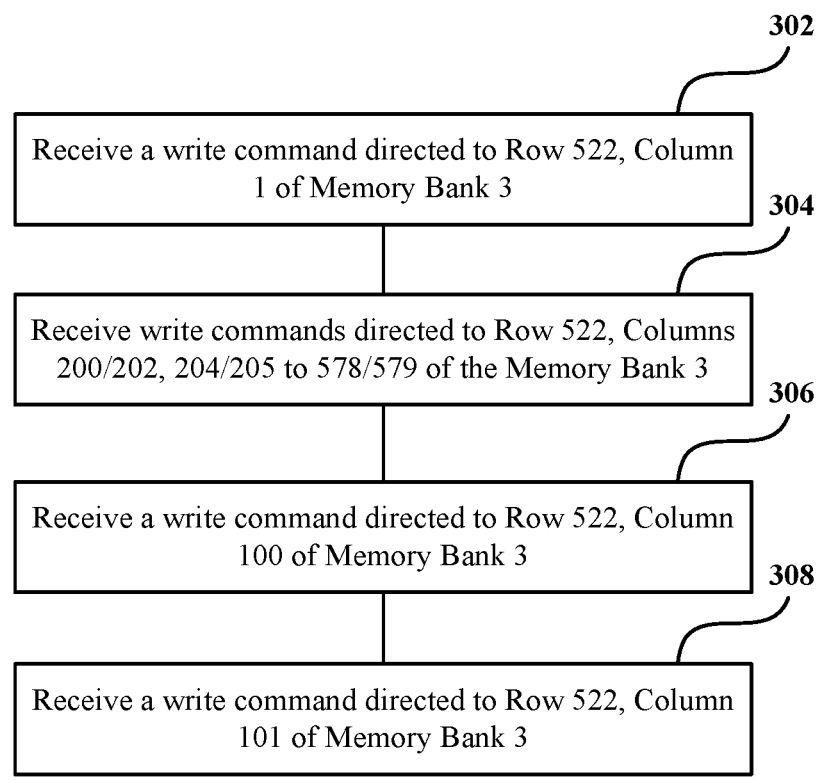
FIG. 3 illustrates an example of using the information processing commands illustrated in FIG. 2 to configure an information memory.

FIG. 3 illustrates an example of configuring an information memory using the information processing commands shown in FIG. 2.

As shown in FIG. 3, in step 302, the access control device receives a write command directed to Row 522, Column 1 of Memory Bank 3, and identifies that the write command is directed to a predetermined storage region of the memory module. The access control device then converts the write command into an information processing command for starting the configuration of Configuration Rule 1 according to the conversion table of information processing commands shown in FIG. 2.

Next, in step 304, the access control device consecutively receives write commands directed to Row 522, Columns 200/202, 204/205 to 578/579 of the Memory Bank 3, and converts the write commands into information processing commands that each writes a specific value "0" or "1" of a respective bit of the configuration information into the Configuration Rule 1 according to the conversion table of information processing command. It can be appreciated by those skilled in the art that the addresses directed to the predetermined storage region included in the write commands that can be converted into the information processing commands can be either distributed or consecutive. For example, Row 522, Columns 200 and 202 are distributed or non-consecutive addresses while Row 522, Columns 204 and 205 are consecutive addresses of the Memory Bank 3).

After that, in step 306, the access control device receives a write command directed to Row 522, Column 100 of Memory Bank 3, and the write command corresponds to the information processing command for ending the configuration.

Finally, in step 308, the access control device receives a write command directed to Row 522, Column 101 of Memory Bank 3, and the write command corresponds to an information processing command for confirming that the configuration information provided in the step 304 is written into the information memory. After the access control device executes such information processing command, the configuration information is written into the corresponding information memory, thereby completing the configuration of the information memory.

It can be understood that the information processing command can be defined according to a specific configuration operation process. In some alternative embodiments, the configuration of an access control rule or the writing of other configuration information may not require step 308. Alternatively, the access control device may execute these information processing commands at step 304, thereby writing the configuration information into the corresponding Information memory.

It should be noted that during the configuration process, since the access control device only needs to operate according to the data access command received via the access control input port and does not need to consider the data writing or reading via the data bus, the data as written or read will not affect the storage of configuration information. Accordingly, the storage space of the memory module corresponding to the information processing command for configuring the information memory may be set not to be used for storing data.

FIG. 4 illustrates a conversion table of access addresses and information processing commands according to an embodiment of the present application. Based on the conversion table, one or more information read commands for reading the information memory can be generated. When the data access command received by the access control device is a read command directed to a predetermined storage region, the control unit may generate one or more corresponding information read commands according to the conversion table.

As shown in FIG. 4, Row 520 of Memory Bank 3 is set as a predetermined storage region for identifying a data access command. When the access control device receives a read command directed to the predetermined storage region, it identifies that the command is a special data access command for reading data information. It can be understood that when the data access command received by the access control device is not directed to Row 520 of Memory Bank 3, but contains an address outside the predetermined storage region of the memory module, the access control device can respond to the data access command by executing a normal data access operation. In addition, since the information write commands shown in FIG. 2 occupy the addresses in Row 522 of Memory Bank 3, the information read commands shown in FIG. 4 will not use the same addresses as the addresses shown in FIG. 2.

According to access addresses in the data access commands that are directed to different columns, for example, Columns 0 to 579 shown in FIG. 4, the control unit 114 may convert the access address into information processing commands corresponding to different data information read operations. For example, a data access command directed to Row 520, Column 0 can be converted into a command for reading data information in Status Register 0 (certain information memory), and a data access command directed to Row 520, Column 1 can be converted into a command for reading data information in Status register 1 (another information memory), and so on. For another example, a data access command directed to Row 520, Column 101 can be converted into a command for starting to read data information, and a data access command directed to Row 520, Column 102 can be converted into a command for ending the reading of data information.

In some embodiments, after determining which status register needs to be read according to the information read commands shown in FIG. 4, the control unit may generate, according to the data information actually stored in the status register, a portion of information processing commands directed to different addresses in the memory module. The control unit may further provide these information processing commands to the memory module, so that the memory module can output data stored in these addresses to indirectly output data information actually stored in the status register. In other words, the control unit may additionally generate one or more information processing commands based on the stored data information without depending on whether the data access command is received, and the generated information processing commands may be directly provided to the memory module. Optionally, the control unit may not provide the memory module with the original data access command received by the access control device.

In other alternative embodiments, the host controller may send a number of special data access commands to the access control device. After identifying the special data access commands, the control unit may generate a same number of information processing commands correspondingly (each data access command corresponds to an information processing command), and each information processing command is provided to the memory module, so that the memory module can then output a piece of data information.

In other alternative embodiments, the host controller may send a number of special data access commands to the access control device. After identifying the special data access commands, the control unit may generate a same number of information processing commands correspondingly (each data access command corresponds to an information processing command), and sequentially provides the received data access commands and the generated information processing commands to the memory module. In this way, the memory module can output data to the host controller in response to the original data access commands and the generated information processing commands. It can be understood that the host controller can identify (for example, based on the timing) the data corresponding to the data access commands and the information processing commands, and extract only the data output according to the information processing commands.

Still referring to FIG. 4, each of the data access commands directed to Row 520, Columns 200 to 579 may correspond to commands for reading or outputting data information actually stored in the corresponding status register. In an actual operation, the control unit may generate, according to the data information stored in the status register, one of a plurality of information processing commands that correspond to the same status register (for example, Columns 200, 202, 204, 205 correspond to the contents A, B, C, D stored in the same Status Register 0, respectively), and these information processing commands are respectively directed to specific storage addresses in a predetermined storage region of the memory module. In other words, the data information is stored in a predetermined storage region of the memory module in a preset data mode, where the preset data mode is, for example, 4-bit, 8-bit, 16-bit, 32-bit data, or other bit data having a specific value. The memory module may output a preset data mode to provide corresponding data information to the host controller. This method of providing data information in a preset data mode can reduce the required information read commands and is beneficial to improving reading efficiency.

In some embodiments, the data information may be stored in plain text without being encrypted. In other embodiments, the data information may be stored in an encrypted form. For example, the data information stored in the information memory may be encrypted data, or the preset data modes stored in the memory module for reading out the data information may also be encrypted. Accordingly, the access control device and/or the host controller may have a module for encryption/decryption. During the reading and writing of data information, data information can be encrypted, which improves the security of data information processing. In particular, the encryption process can be dynamically configured. For example, the access control device can identify authorized users and unauthorized users, and only allow users to configure or read data information after the users pass authentication (i.e. authorized users).

Figure 5:
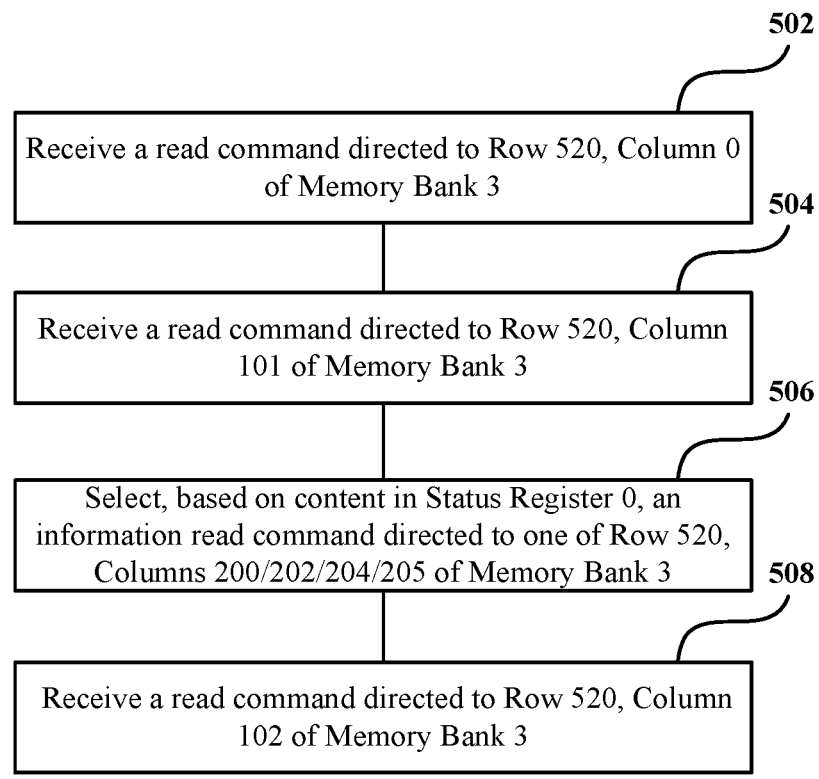
FIG. 5 illustrates an example of reading an information memory by using the information processing commands illustrated in FIG. 4.

FIG. 5 illustrates an example of reading an information memory using the information processing commands shown in FIG. 4.

As shown in FIG. 5, in step 502, the access control device receives a read command directed to Row 520, Column 0 of Memory Bank 3, and identifies that the read command is directed to a predetermined storage region of the memory module. According to the conversion table of information processing commands shown in FIG. 4, the access control device converts the read command into an information read command for starting to read data information in Status Register 0.

Next, in step 504, the access control device receives a read command directed to Row 520, Column 101 of Memory Bank 3, and converts the read command into an information read command for starting to read according to the conversion table of information processing commands. At this time, reading of data information starts.

After that, in step 506, the access control device selects and generates, based on the data information in Status Register 0, an information read command directed to an address in Row 520, Columns 200/202/204/205 of Memory Bank 3, for example, directed to Row 520, Column 200. The generated information read command can indicate Data Information A which is actually stored in Status Register 0. Further, the access control device provides the information read command to the memory module, which outputs Data Information A to the host controller.

Finally, in step 508, the access control device receives a read command directed to Row 520, Column 102 of Memory Bank 3, and converts the read command into an information read command for ending the reading according to the conversion table of information processing commands. At this time, the reading of the data information is completed.

In some embodiments, the size of data information stored in a status register may be large, and it may be undesired to list all possible data information by enumeration, or it may require too much storage space to list data information by enumeration. In some embodiments, the data information actually stored in the information memory can be read out bit by bit in a sequential reading manner.

FIG. 6 illustrates another conversion table of access addresses and information processing commands according to an embodiment of the present application. Based on the conversion table, one or more information read commands for reading the information memory can be generated.

As shown in FIG. 6, different from the conversion table shown in FIG. 4 which includes multiple information read commands for outputting data information, the conversion table shown in FIG. 6 includes only two information read commands for outputting specific values of data information. That is, an information read command directed to Row 520, Column 200 of Memory Bank 3 is used to output 0, and another information read command directed to Row 520, Column 202 of Memory Bank 3 is used to output 1.

Assuming that each status register is a 32-bit register, when outputting the data information stored in the status register, 32 consecutive information read commands can be generated based on the data information stored in the status register, so as to use these 32 information read commands together (sequentially transmitted to the memory module) to instruct the memory module to output the corresponding data information to the host controller.

In order to achieve the sequential reading, the conversion table shown in FIG. 6 also provides three information read commands to control the output of data information, that is, the information processing commands of starting to read, sequential reading and ending to read, which are directed to Row 520, Columns 101, 102 and 103 of Memory Bank 3, respectively.

Figure 7:
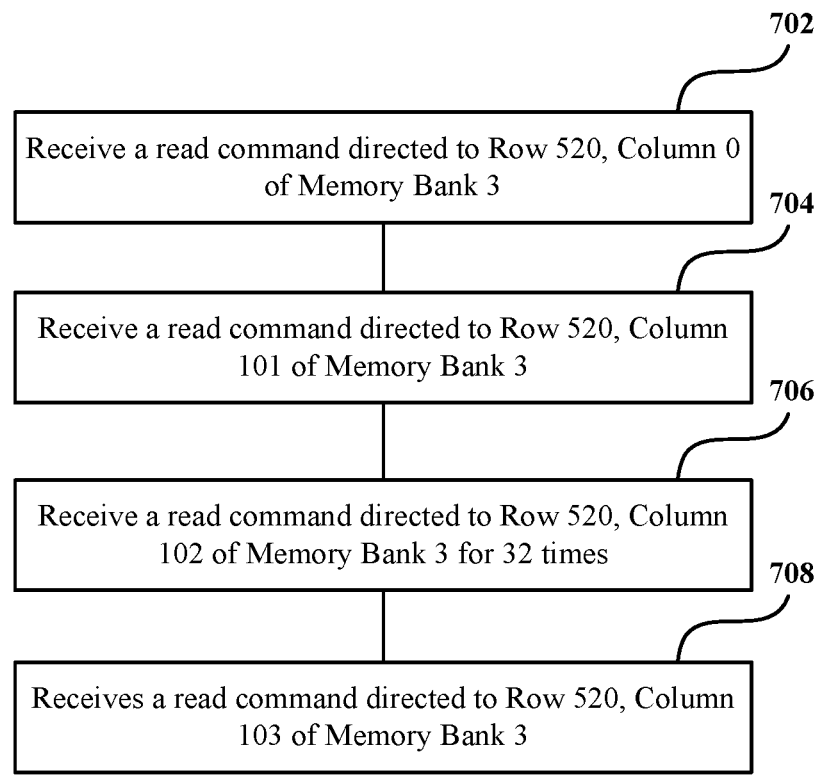
FIG. 7 illustrates an example of reading an information memory by using the information processing commands illustrated in FIG. 6.

FIG. 7 illustrates an example of reading an information memory using the information processing commands shown in FIG. 6.

As shown in FIG. 7, in step 702, an access control device receives a read command directed to Row 520, Column 0 of Memory Bank 3, and identifies that the read command is directed to a predetermined storage region of the memory module. According to the conversion table of information processing commands shown FIG. 6, the access control device converts the special read command into an information processing command for starting to read data information in the Status Register 0.

Next, in step 704, the access control device receives a read command directed to Row 520 and Column 101 of Memory Bank 3, and converts the read command into an information read command to start reading according to the conversion table of information processing commands. At this time, reading of data information starts.

After that, in step 706, the access control device generates 32 consecutive information read commands directed to Row 520, Column 102 of Memory Bank 3, wherein all information read commands are generated based on the data information actually stored in Status Register 0, and are sequentially directed to Row 520, Column 200 or 202 of Memory Bank 3. Further, the access control device sequentially provides these information read commands to the memory module, so that the memory module sequentially provides corresponding data information to the host controller. As mentioned above, in order to generate the 32 information read commands, the host controller can send 32 corresponding data access commands to the access control device, and the control unit may generate the 32 information read commands based on the 32 data access commands and the data information stored in the status register. Alternatively, the control unit may also generate 32 information read commands based on the data information stored in the status register, and directly provide the 32 information read commands to the memory module.

Finally, in step 708, the access control device receives a read command directed to Row 520, Column 103 of Memory Bank 3, and converts the read command into an information read command for ending the reading operation according to the conversion table of information processing commands. At this time, the reading of the data information is completed.

FIG. 8 illustrates another conversion table of access addresses and information processing commands according to an embodiment of the present application. Based on the conversion table, one or more information read commands for reading the information memory can be generated.

Unlike the conversion table shown in FIG. 6, which repeatedly uses two information read commands for outputting specific values of data information, the conversion table shown in FIG. 8 associates each data bit of the data information stored in each information memory with one or more information read commands.

Assuming that each status register is a 32-bit register. As shown in FIG. 8, each bit of the register corresponds to two information read commands. For example, values 0 and 1 in a 0th bit of data (bit0) correspond to information read commands directed to Row 520, Column 200 and Column 202 of Memory Bank 3 respectively. For another example, values 0 and 1 in a 1st bit of data (bit1) correspond to information read commands directed to Row 520, Column 204 and Column 205 of Memory Bank 3 respectively, and so on. Lastly, values 0 and 1 in a 31st bit of data (bit31) correspond to information read commands directed to Row 520, Column 578 and Column 579 of Memory Bank 3 respectively.

When outputting the data information stored in the status register, the control unit can generate 32 information read commands according to the bits of the data information stored in the status registers, so as to use these 32 information read commands together (sequentially transmitted to the memory module) to instruct the memory module to output the corresponding data information to the host controller. Compared with the information read commands and reading process shown in FIGS. 6 and 7, FIG. 8 associates each bit of data in the data information with a respective information read command. This command setting method can ensure the reading of data information safely, and users can also confirm the accuracy of data transmission by repeatedly reading the data of certain address. In addition, the command setting method of FIG. 8 is particularly applicable to a case where a portion of bits in the information memory are used to store data information, and only the used portion of bits can be read when reading the data information.

It can be seen that the manner of transmitting, reading and configuring the information memory of the access control device using transmission and processing mechanism for data access commands can be well compatible with the access control system for an existing memory module, and can dynamically configure and read data information during data accessing to the memory module.

In addition, a circuit designer can encode information processing commands based on access and configuration needs, which also improves the flexibility and configurability of access control. It can be understood that the conversion tables of information processing commands defined in FIG. 2, FIG. 4, FIG. 6, and FIG. 8 are merely exemplary, and a circuit designer or user may add, reduce, or adjust the types and numbers of the information processing commands, and adjust the position of a predetermined storage region in the memory module to which these information processing commands are directed. For example, the conversion table can be added, modified or deleted, either in advance during initialization (e.g. power-on) of the memory system or dynamically in response to certain trigger events (e.g. start of access to the memory system by the host controller or by a specific application being executed on the host controller), through an $I^2C$ bus (e.g. SMBus) or any other proper buses coupling the access control device with the host controller. It should be noted that, in the conversion tables provided in FIG. 2, FIG. 4, FIG. 6, and FIG. 8, the access addresses are generally consequentially encoded in order, the information processing commands corresponding to adjacent or similar access addresses may have related or similar functions, or are directed to adjacent or similar information memories. However, the setting of these conversion tables is only exemplary. In other embodiments, the access addresses may be non-consequentially encoded. For example, one or more access addresses may not correspond to any information processing command, or two adjacent or similar access addresses may correspond to information processing commands with different functions. In the example shown in FIG. 2, addresses of Row 522, Columns 0 to 99 correspond to commands for starting to configure Rules 0 to 99, respectively. However, in another example, the addresses included in the conversion table can be non-consecutive but evenly or randomly distributed. For example, a first address of Row 522, Column 0 may correspond to a first command for starting to configure Rule 0, a second address of Row 522, Column 3 (with two addresses in the columnar direction skipped) may correspond to a second command for starting to configure Rule 1 (also with two addresses in the columnar direction skipped), a third address of Row 522, Column 6 may correspond to a third command for starting to configure Rule 2, a fourth address of Row 522, Column 9 may correspond to a fourth command for starting to configure Rule 3 . . . . In yet another example, a first address of Row 522, Column 6 may correspond to a first command for starting to configure Rule 0, a second address of Row 522, Column 23 may correspond to a second command for starting to configure Rule 1, a third address of Row 522, Column 13 may correspond to a third command for setting a bit (e.g. bit3) in the information memory as 0, a fourth address of Row 523, Column 15 (in another row of a bank or the memory module) may correspond to a fourth command for setting a bit (e.g. bit3) in the information memory as 1 . . . . That is, the commands in the conversion table can be randomly or irregularly associated with the addresses in the memory module which are occupied and used for encoding/decoding of information processing commands. Those skilled in the art can make adjustments and settings as needed. In fact, the irregular conversion may be helpful to improve the security of the conversion table, thereby improving the security of the entire memory system. In some embodiments, the conversion table may be integrated in the access control device in advance, or may be written into the access control device through a data or control bus.

It should be noted that although several modules or sub-modules of the device for controlling access to a memory module are mentioned in the detailed description above, this division is merely exemplary and not mandatory. In fact, according to the embodiments of the present application, the features and functions of the two or more modules described above may be embodied in one module. Conversely, the features and functions of one module described above can be further divided into multiple modules to be embodied.

Those skilled in the art can understand and implement other changes to the disclosed embodiments by studying the description, the disclosure, and the drawings and the appended claims. In the claims, the word "comprising" does not exclude other elements and steps, and the words "a" and "an" do not exclude plural. In the actual application of this application, one part may perform the functions of multiple technical features cited in the claims. Any reference signs in the claims should not be construed as limiting the scope.

What is claimed is:

1. An apparatus for controlling access to a memory module, the memory module being coupled to a host controller via a data bus to exchange data with the host controller, the apparatus having a configurable information memory configured to store configuration information of an access control rule for monitoring access to the memory module, and the apparatus comprising:
an access control input port via which the apparatus receives a data access command from the host controller;
a control unit configured to identify a data access command based on whether an access address included in the data access command is directed to a predetermined storage region of the memory module wherein the control unit is further configured to:
  when the access address is directed to the predetermined storage region, generate an information processing command based at least on the access address directed to the predetermined storage region, such that the control unit can configure the information memory based on the information processing command or provide the information processing command to the memory module, and wherein a portion of the predetermined storage region corresponding to the information processing command for configuring the information memory is set not to be used for storing data; and
  when the access address is directed a storage region of the memory module other than the predetermined storage region, allow for data access operation to the directed storage region based on the data access command; and
an access control output port via which the apparatus provides the information processing command to the memory module, such that the memory module outputs corresponding data information to the host controller based on the information processing command.

2. The apparatus of claim 1, wherein the access control input port comprises a command/address signal input port coupled to the host controller.

3. The apparatus of claim 1, wherein the access control output port comprises a command/address signal output port coupled to the host controller.

4. The apparatus of claim 1, wherein the data access command is a write command, or a read command directed to the predetermined storage region, and the control unit is configured to convert the access address included in the write command or the read command into a corresponding information write command, and configure the information memory based on the information write command.

5. The apparatus of claim 1, wherein the data access command is a read command directed to the predetermined storage region, and the control unit is configured to generate one or more corresponding information read commands based on the access address included in the read command and data information stored in the information memory, wherein at least a portion of the generated one or more information read commands comprise one or more access addresses directed to the predetermined storage region, such that, after the at least a portion of the generated one or more information read commands are provided to the memory module, the memory module can output corresponding data information to the host controller via the data bus based on the one or more access addresses directed to the predetermined storage region.

6. The apparatus of claim 5, wherein the data information is stored in the predetermined storage region in a preset data mode.

7. The apparatus of claim 1, wherein the data information is stored in encrypted form.

8. The apparatus of claim 6, wherein the data information is stored in encrypted form.

9. The apparatus of claim 1, wherein the apparatus is integrated in a register clock driver.

10. The apparatus of claim 1, wherein the memory module is coupled to the host controller via the data bus and a data buffer.

11. A storage system including a memory module and an apparatus for controlling access to the memory module, the memory module being coupled to a host controller via a data bus to exchange data with the host controller, the apparatus having a configurable information memory configured to store configuration information of an access control rule for monitoring access to the memory module, and the apparatus comprising:
  an access control input port via which the apparatus receives a data access command from the host controller;
  a control unit configured to identify a data access command based on whether an access address included in the data access command is directed to a predetermined storage region of the memory module, wherein the control unit is further configured to:
    when the access address is directed to the predetermined storage region, generate an information processing command based at least on the access address directed to the predetermined storage region, such that the control unit can configure the information memory based on the information processing command or provide the information processing command to the memory module, and wherein a portion of the predetermined storage region corresponding to the information processing command for configuring the information memory is set not to be used for storing data; and
    when the access address is directed a storage region of the memory module other than the predetermined storage region, allow for data access operation to the directed storage region based on the data access command; and
  an access control output port via which the apparatus provides the information processing command to the memory module, such that the memory module outputs corresponding data information to the host controller based on the information processing command.

12. A method for controlling access to a memory module, the memory module being coupled to a host controller via a data bus to exchange data with the host controller, the method comprising:
  A) receiving a data access command from the host controller;
  B) identifying a data access command based on whether an access address included in the data access command is directed to a predetermined storage region of the memory module, and
  C) when the access address is directed to the predetermined storage region, generating an information processing command based at least on the access address directed to the predetermined storage region, and configuring a configurable information memory based on the information processing command, or providing the information processing command to the memory module, such that the memory module outputs corresponding data information based on the information processing command; wherein the configurable information memory is configured for storing configuration information of an access control rule for monitoring access to the memory module, and a portion of the predetermined storage region corresponding to the information processing command for configuring the information memory is set not to be used for storing data; or
  when the access address is directed a storage region of the memory module other than the predetermined storage region, allowing for data access operation to the directed storage region based on the data access command.

13. The method of claim 12, wherein the data access command is received via a command/address signal input port coupled to the host controller.

14. The method of claim 12, wherein the data access command is output via a command/address signal output port coupled to the memory module.

15. The method of claim 12, wherein the data access command is a write command directed to the predetermined storage region, and the step C comprises:
converting the access address included in the write command into a corresponding information write command, and
configuring the information memory based on the information write command.

16. The method of claim 12, wherein the data access command is a read command directed to the predetermined storage region, and the step C comprises:
generating one or more corresponding information read commands based on the access address included in the read command and data information stored in the information memory, wherein a portion of the generated one or more information read commands include one or more access addresses directed to the predetermined storage region;
providing, to the memory module, the generated one or more information read commands including the one or more access addresses directed to the predetermined storage region; and
outputting, by the memory module and based on the one or more access addresses directed to the predetermined storage region, the corresponding data information to host controller via the data bus.

17. The method of claim 12, wherein the data information is stored in the predetermined storage region in a preset data mode.

\* \* \* \* \*